(12) United States Patent
Hotard

(10) Patent No.: US 12,195,072 B2
(45) Date of Patent: Jan. 14, 2025

(54) SYSTEMS AND METHODS FOR ADDING WHEELS TO AN INFANT CHILD SEAT

(71) Applicant: GRACO CHILDREN'S PRODUCTS, INC., Atlanta, GA (US)

(72) Inventor: David Thomas Hotard, Norcross, GA (US)

(73) Assignee: GRACO CHILDREN'S PRODUCTS INC., Atlanta, GA (US)

( * ) Notice: Subject to any disclaimer, the term of this patent is extended or adjusted under 35 U.S.C. 154(b) by 9 days.

(21) Appl. No.: 17/805,756

(22) Filed: Jun. 7, 2022

(65) Prior Publication Data

US 2022/0388561 A1 Dec. 8, 2022

Related U.S. Application Data

(60) Provisional application No. 63/197,857, filed on Jun. 7, 2021.

(51) Int. Cl.
*B62B 7/14* (2006.01)
*B60N 2/28* (2006.01)

(52) U.S. Cl.
CPC ............ *B62B 7/142* (2013.01); *B60N 2/2845* (2013.01); *B60N 2/2848* (2013.01); *B62B 7/145* (2013.01)

(58) Field of Classification Search
CPC .......... B62B 7/142; B62B 7/145; B62B 7/08; B62B 7/006; B62B 7/12; B62B 7/00; B62B 7/14; B62B 7/06; B62B 9/20; B62B 9/12; B60N 2/2845; B60N 2/2848; B60N 2/26; B60N 2/2821; B60N 2/28
See application file for complete search history.

(56) References Cited

U.S. PATENT DOCUMENTS 5,234,224 A * 8/1993 Kim .......................... B62B 7/12
280/30
5,499,831 A * 3/1996 Worth ....................... B62B 7/08
280/30

(Continued)

OTHER PUBLICATIONS

Doona, "Car Seat & Stroller" https://www.doona.com/en-US/car-seat-stroller/collections/doona-racing-green, accessed Aug. 23, 2022, 1.

(Continued)

*Primary Examiner* — James M Dolak
(74) *Attorney, Agent, or Firm* — Eversheds Sutherland (US) LLP

(57) ABSTRACT

A system for converting an infant child seat to a stroller may include an infant child seat, a wheeled frame, and a handle. The handle is coupled to the infant child seat and configured to manipulate the wheeled frame when the infant child seat is mounted. A wheeled frame, being removably securable to an infant child seat, may include a frame movable between a folded storage configuration and an expanded stroller configuration. The frame is configured to removably receive an infant child seat and includes a plurality of wheels. The wheeled frame does not define a handle. A method of converting an infant child seat including a handle to a stroller may include coupling the seat to a wheeled frame. The method further includes manually actuating, by a first hand of a user, the handle into a stroller position. The seat coupled to the frame are operable as a stroller.

15 Claims, 4 Drawing Sheets

(56) References Cited

U.S. PATENT DOCUMENTS

| | | | | |
|---|---|---|---|---|
| 6,189,914 B1 | * | 2/2001 | Worth | B62B 7/08 280/643 |
| 6,193,263 B1 | * | 2/2001 | Lin | B62B 7/145 280/30 |
| 6,446,990 B1 | * | 9/2002 | Nania | B62B 7/145 280/47.38 |
| 6,695,400 B2 | * | 2/2004 | Washizuka | B62B 7/083 297/217.2 |
| 6,988,736 B2 | * | 1/2006 | Lee | B62B 7/142 280/30 |
| 7,464,957 B2 | * | 12/2008 | Worth | B62B 7/145 280/642 |
| 7,513,512 B2 | * | 4/2009 | Yoshie | B60N 2/2845 280/47.38 |
| 7,775,532 B2 | * | 8/2010 | Chen | B62B 7/145 280/47.38 |
| 7,832,755 B2 | * | 11/2010 | Nolan | B62B 7/068 280/47.38 |
| 7,878,527 B2 | * | 2/2011 | Popp | B62B 7/10 280/47.38 |
| 8,087,680 B2 | * | 1/2012 | Dotsey | B60B 33/0039 280/47.38 |
| 8,231,136 B2 | * | 7/2012 | Fiore, Jr. | B62B 7/145 280/47.38 |
| 8,434,781 B2 | | 5/2013 | Mazar et al. | |
| 8,469,389 B2 | | 6/2013 | Mazar et al. | |
| 8,469,390 B2 | | 6/2013 | Mazar et al. | |
| 8,783,708 B2 | * | 7/2014 | Storm | B62B 7/10 280/47.38 |
| 8,801,028 B2 | | 8/2014 | Mazar et al. | |
| 8,876,208 B2 | * | 11/2014 | Heisey | B60N 2/2827 297/130 |
| 8,967,657 B2 | * | 3/2015 | Burchi | B62B 7/083 280/649 |
| 9,108,654 B2 | * | 8/2015 | Kozinski | B62B 7/006 |
| 9,199,659 B2 | * | 12/2015 | Chen | B62B 9/12 |
| 9,200,746 B2 | * | 12/2015 | Xiao | F16M 11/00 |
| 9,260,039 B1 | * | 2/2016 | Satterfield | B60N 2/2845 |
| 9,505,321 B2 | | 11/2016 | Mazar | |
| 9,637,153 B2 | * | 5/2017 | Sclare | B62B 5/0016 |
| 9,756,962 B2 | * | 9/2017 | Perrin | A47D 9/00 |
| 9,834,118 B2 | * | 12/2017 | Kunkel | B62B 7/02 |
| 9,834,239 B2 | * | 12/2017 | Newton | B62B 7/006 |
| 9,918,561 B2 | * | 3/2018 | Perrin | A47D 1/06 |
| 10,413,085 B2 | * | 9/2019 | Haut | A47D 1/0081 |
| 11,027,762 B2 | * | 6/2021 | Hartenstine | B62B 7/062 |
| 11,807,289 B2 | * | 11/2023 | Zhong | B62B 9/102 |
| 11,834,091 B2 | * | 12/2023 | Zhong | B62B 7/14 |
| RE49,798 E | * | 1/2024 | Coote | B60N 2/2848 |
| 11,932,300 B1 | * | 3/2024 | Jablonski | B62B 7/142 |
| 11,945,491 B2 | * | 4/2024 | Horst | B62B 7/062 |
| 11,987,281 B2 | * | 5/2024 | Guo | B62B 9/12 |
| 11,993,301 B2 | * | 5/2024 | Cheng | E05C 3/30 |
| 11,993,302 B2 | * | 5/2024 | Zheng | B62B 9/085 |
| 12,077,205 B2 | * | 9/2024 | Hartenstine | B62B 7/08 |
| 2009/0127827 A1 | * | 5/2009 | Pike | B60N 2/2845 280/648 |
| 2010/0052373 A1 | * | 3/2010 | Kono | B62B 7/145 280/47.38 |

OTHER PUBLICATIONS

Graco, "SnugRider® Elite Stroller" https://www.gracobaby.com/strollers/compact-lightweight-strollers/snugrider-elite-stroller/SAP_1934883.html, accessed Aug. 23, 2022, 7 pages.

* cited by examiner

SYSTEMS AND METHODS FOR ADDING WHEELS TO AN INFANT CHILD SEAT

CROSS-REFERENCE TO RELATED APPLICATIONS

The present application claims the benefit of U.S. Provisional Application No. 63/197,857, filed on Jun. 7, 2021, which is incorporated by reference in its entirety.

TECHNICAL FIELD

The present disclosure relates generally to a child restraint system and, in particular, relates to systems and methods for adding wheels to an infant child seat.

BACKGROUND

Infant child seats are designed to secure an infant or small child when traveling with the child in an automobile. Traditionally, exiting an automobile includes removing the child from the infant child seat and placing the child in the seat of a stroller, which is usually stored in the trunk of the automobile when not in use. This scenario involves both an infant child seat secured within the automobile and an entirely separate stroller equipped with a seat, constituting two separate apparatus that cannot easily be transported together due to their combined bulk.

Prior attempts at consolidating the stroller and the infant child seat have incorporated the infant child seat into the stroller by rotating the handle on the infant child seat into a stowed position that will not interfere with the handle on the stroller. Thus, the child remains in the infant child seat while the seat is removed from the automobile and coupled to the stroller. However, this scenario involves a redundant handle on the infant child seat when coupled to the stroller and the stroller portion, even without a dedicated stroller-seat, includes a weighty and sizable handle.

Other attempts at consolidating the stroller and the infant child seat have incorporated foldable legs with wheels into the infant child seat itself. However, this scenario significantly increases the weight of the system and makes carrying the infant child seat a burden.

SUMMARY

The present disclosure describes systems for converting an infant child seat to a stroller, for example, by coupling a wheeled frame to the infant child seat. In embodiments, a system includes an infant child seat, a wheeled frame, and a handle configured to carry the infant child seat when separated from the wheeled frame. The handle is further configured to manipulate the wheeled frame when the infant child seat is mounted to the wheeled frame. The handle is coupled to the infant child seat.

In embodiments, a wheeled frame, being removably securable to an infant child seat, includes a frame movable between a folded storage configuration and an expanded stroller configuration. The frame is configured to removably receive an infant child seat in the expanded stroller configuration. The wheeled frame further includes a plurality of wheels coupled to the frame. The wheeled frame does not define a handle in the expanded stroller configuration.

In embodiments, a method of converting an infant child seat including a rotatable handle to a stroller includes coupling the infant child seat to a wheeled frame expanded in an operable configuration. The method further includes manually actuating, by a first hand of a user, the rotatable handle into a stroller position. The infant child seat coupled to the wheeled frame are operable as a stroller.

BRIEF DESCRIPTION OF THE DRAWINGS

The detailed description is set forth with reference to the accompanying drawings. The use of the same reference numerals may indicate similar to identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

Figure 1:
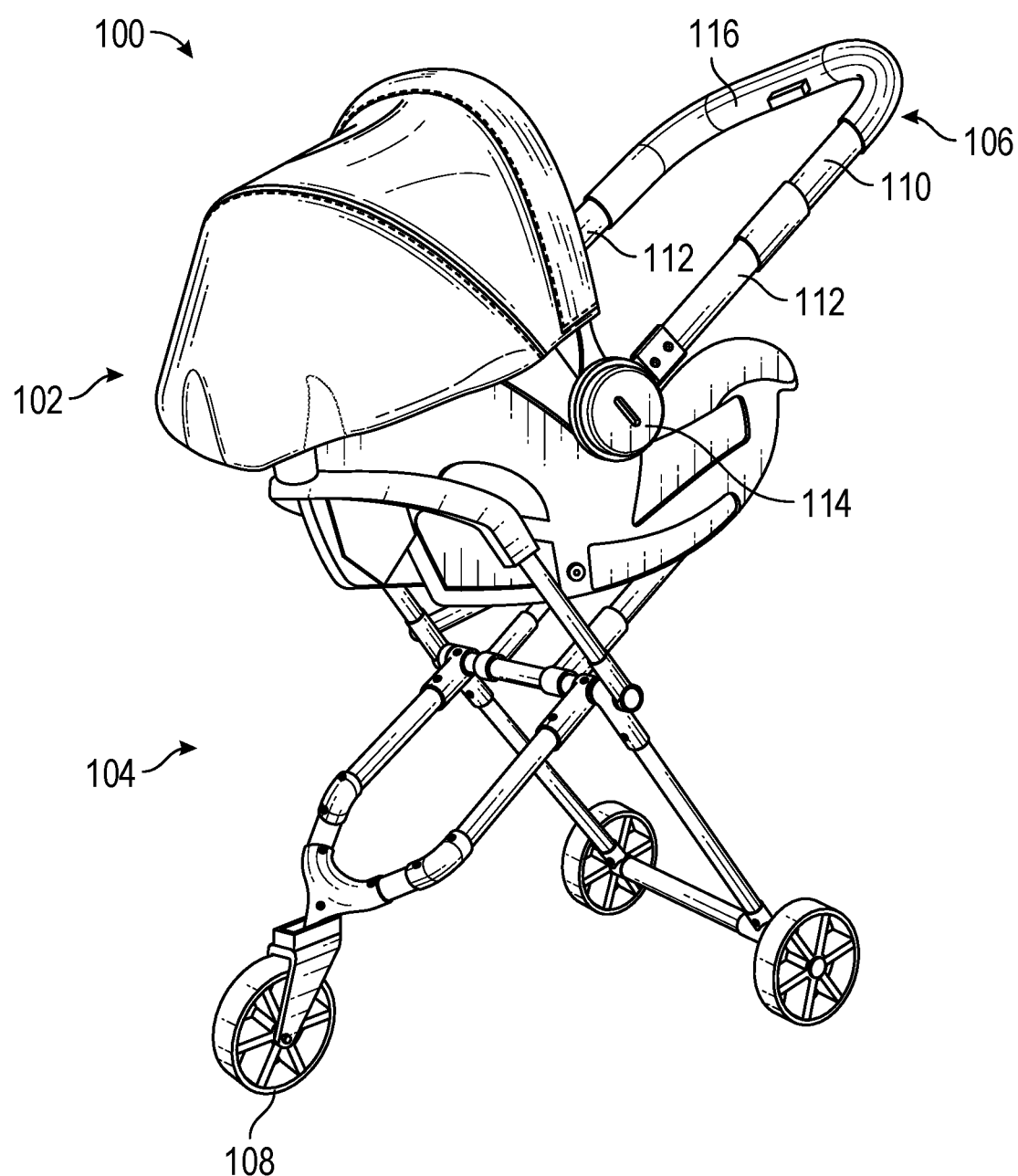
FIG. 1 illustrates a perspective view of an example system for adding wheels to an infant child seat according to an embodiment of the disclosure.

Example embodiments now will be described more fully hereinafter with reference to the accompanying drawings, in which example embodiments are shown. The concept disclosed herein may, however, be embodied in many different forms and should not be construed as limited to the exemplary embodiments set forth herein; rather, these embodiments are provided so that this disclosure will be thorough and complete, and will fully convey the scope of the claimed concept to those of ordinary skill in the art. Like numbers refer to like, but not necessarily the same, elements throughout.

DETAILED DESCRIPTION

The example embodiments described herein and shown in the figures are described with reference to an infant child seat that includes a telescopic handle and wheeled frame to which the infant child seat is coupled, thereby converting the infant child seat into a stroller. The wheeled frame is configured to be foldable into a compact storage configuration when not coupled to the infant child seat. Certain dimensions and features of the example stroller are described herein using the term "approximately." As used herein, the term "approximately" indicates that each of the described dimensions is not a strict boundary or parameter and does not exclude functionally similar variations therefrom. Unless context or the description indicates otherwise, the use of the term "approximately" in connection with a numerical parameter indicates that the numerical parameter includes variations that, using mathematical and industrial principles accepted in the art (e.g., rounding, measurement or other systematic errors, manufacturing tolerances, etc.), would not vary the least significant digit.

In addition, certain relationships between dimensions of the infant child seat and wheeled frame and between features of the infant child seat and wheeled frame are described herein using the term "substantially." As used herein, the terms "substantially" and "substantially equal" indicates that the equal relationship is not a strict relationship and does not exclude functionally similar variations therefrom. Unless context or the description indicates otherwise, the use of the term "substantially" or "substantially equal" in connection with two or more described dimensions indicates that the equal relationship between the dimensions includes variations that, using mathematical and industrial principles accepted in the art (e.g., rounding, measurement or other systematic errors, manufacturing tolerances, etc.), would not vary the least significant digit of the dimensions. As used herein, the term "substantially constant" indicates that the constant relationship is not a strict relationship and does not exclude functionally similar variations therefrom. As used herein, the term "substantially parallel" indicates that the parallel relationship is not a strict relationship and does not exclude functionally similar variations therefrom.

Throughout this disclosure, various aspects are presented in a range format. It should be understood that the description in range format is merely for convenience and brevity and should not be construed as an inflexible limitation on the scope of the disclosure. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6, etc., as well as individual numbers within that range, for example, 1, 2, 3, 4, 5, and 6. This applies regardless of the breadth of the range.

The present disclosure describes systems for converting an infant child seat to a stroller, for example, by coupling a wheeled frame to the infant child seat. In embodiments, a system includes an infant child seat, a wheeled frame, and a handle configured to carry the infant child seat when separated from the wheeled frame. The handle is further configured to manipulate the wheeled frame when the infant child seat is mounted to the wheeled frame. The handle is coupled to the infant child seat.

In embodiments, a wheeled frame, being removably securable to an infant child seat, includes a frame movable between a folded storage configuration and an expanded stroller configuration. The frame is configured to removably receive an infant child seat in the expanded stroller configuration. The wheeled frame further includes a plurality of wheels coupled to the frame. The wheeled frame does not define a handle in the expanded stroller configuration.

In embodiments, a method of converting an infant child seat including a rotatable handle to a stroller includes coupling the infant child seat to a wheeled frame expanded in an operable configuration. The method further includes manually actuating, by a first hand of a user, the rotatable handle into a stroller position. The infant child seat coupled to the wheeled frame are operable as a stroller.

FIG. 1 illustrates a perspective view of an example system for adding wheels to an infant child seat according to an embodiment of the disclosure. The example system 100 includes an infant child seat 102 and a wheeled frame 104. The infant child seat 102 may include a handle 106, depicted in FIG. 1 in an elongated position and in a stroller position for pushing the wheeled frame 104 when the infant child seat 102 is mounted to the wheeled frame 104. The wheeled frame 104 includes a plurality of wheels 108 and may be opened into an operable configuration, as depicted in FIG. 1.

The wheeled frame 104 is removably securable to the infant child seat 102, and includes a frame movable between a folded storage configuration and an expanded stroller configuration. The frame configured to removably receive the infant child seat 102 in the expanded stroller configuration. The plurality of wheels 108 is coupled to the frame. In some embodiments, the plurality of wheels 108 consists of three wheels, so that the wheeled frame itself consists of three wheels.

The wheeled frame 104 may not itself define a handle in the expanded stroller configuration. For example, no portion of the wheeled frame 104 defines or is intended for use as a handle when the infant child seat 102 is coupled to the wheeled frame. One or more portions of the wheeled frame 104 may be used as a handle when the infant child seat 102 is removed from the wheeled frame 104, for example, to facilitate storage and transport of a folded wheeled frame 104.

As used herein, the "operable configuration" of the wheeled frame 104 is characterized by placing the wheels 108 of the wheeled frame onto a surface, such as the floor or ground.

In certain embodiments, the handle 106 may include a handling portion 110 and a pair of arms 112. The handling portion 110 may be slidably disposed within the pair of arms 112. The pair of arms 112 may be rotatably coupled to the infant child seat 102 at hub 114 and may be rotatable between (i) a carrying position for carrying the infant child seat 102 when separated from the wheeled frame 104, (ii) a stroller position for pushing the wheeled frame 104 when the infant child seat 102 is mounted to the wheeled frame 104, and (iii) a stowed position for securing the infant child seat 102 in an automobile or storing the infant child seat 102 when not in use. The handling portion 110 may be configured to slide between a recessed position suitable for carrying the infant child seat 102 or securing the infant child seat 102 in an automobile, or an elongated position suitable for pushing the wheeled frame 104 when the infant child seat 102 is coupled to the wheeled frame 104, as depicted in FIG. 1. The handle 106 may include a handle lock 116 that may be actuated by a user to lock the handling portion 110 into the recessed position or, in the alternative, into the elongated position.

In certain embodiments, infant child seat 102 may include a first coupling means 118 and wheeled frame 104 may further include a second coupling means 120 configured to couple to the first coupling means 118 when the infant child seat 102 is mounted on the wheeled frame 104. The second coupling 120 means may include bars and/or a rounded or U-curved portion of the wheeled frame 104. The first coupling means 118 may include a lower portion of the infant child seat 102, for example, a surface complementary to one or portions of the wheeled frame. In some embodiments, securing the first and second coupling means 118 and 120 may provide an audible or tactile feedback, such as a click.

The frame of the wheeled frame 104 may include an upper portion defining an angled interior configured to receive the infant child seat 102 in a substantially horizontal position. The upper portion may include the coupling means 118 configured to couple the infant child seat 102 to the wheeled frame 104 in the expanded stroller configuration.

In embodiments, the wheeled frame 104 further includes a lower section and an axle 130 coupling the lower section to the upper section. The frame may be foldable about the axle 130 between the folded storage configuration and the expanded stroller configuration.

Figure 2:
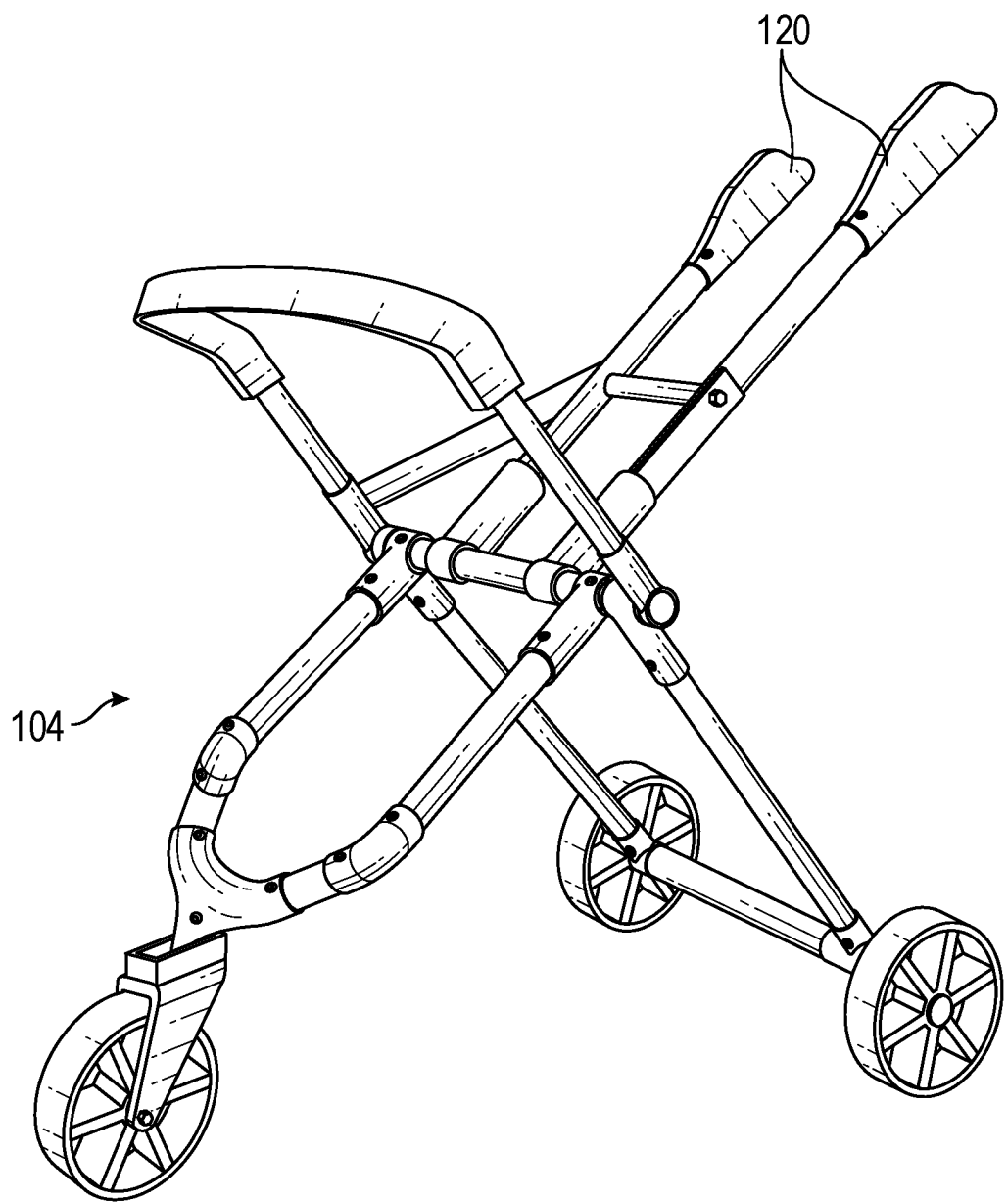
FIG. 2 illustrates a perspective view of an example wheeled frame in an operable configuration according to an embodiment of the disclosure.
Figure 3:
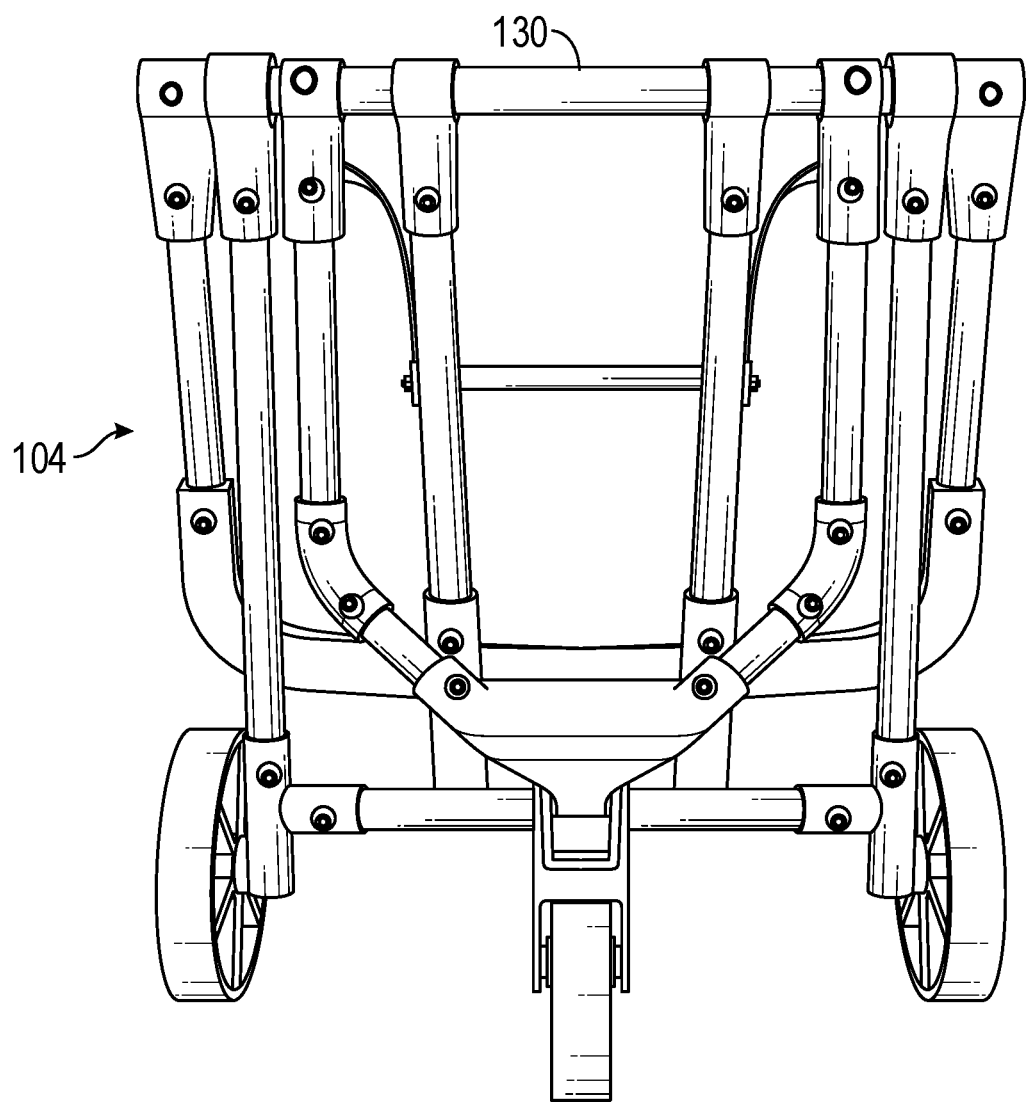
FIG. 3 illustrates a front view of an example wheeled frame in a storage configuration according to an embodiment of the disclosure.

FIG. 2 illustrates a perspective view of an example wheeled frame 104 in an operable configuration according to an embodiment of the disclosure. FIG. 3 illustrates a front view of an example wheeled frame 104 that has been folded into a storage configuration according to an embodiment of the disclosure. In the storage configuration, wheeled frame 104 may be placed in a standard airplane overhead compartment and/or in the floorboard of an automobile. Wheeled frame 104 may have a weight of between about 5 pounds (2.3 kg) and 8 pounds (3.6 kg), representing a significant reduction in weight as compared to traditional strollers or strollers that omit a dedicated child seat. When in the storage configuration, wheeled frame 104 may have a height of between about 15 inches (38.1 cm) and 20 inches (50.8 cm). When in the storage configuration, wheeled frame 104 may have a width of between about 14 inches (35.6 cm) and 19 inches (48.3 cm). When in the storage configuration, wheeled frame 104 may have a depth of between about 4 inches (10.2 cm) and 8 inches (20.3 cm). When in the storage configuration, the wheeled frame 104 may have a volume that does not exceed about 14 square feet (1.3 m$^2$), representing a significant reduction in size and requisite storage space as compared to traditional strollers or other strollers that omit a dedicated child seat.

Figure 4:
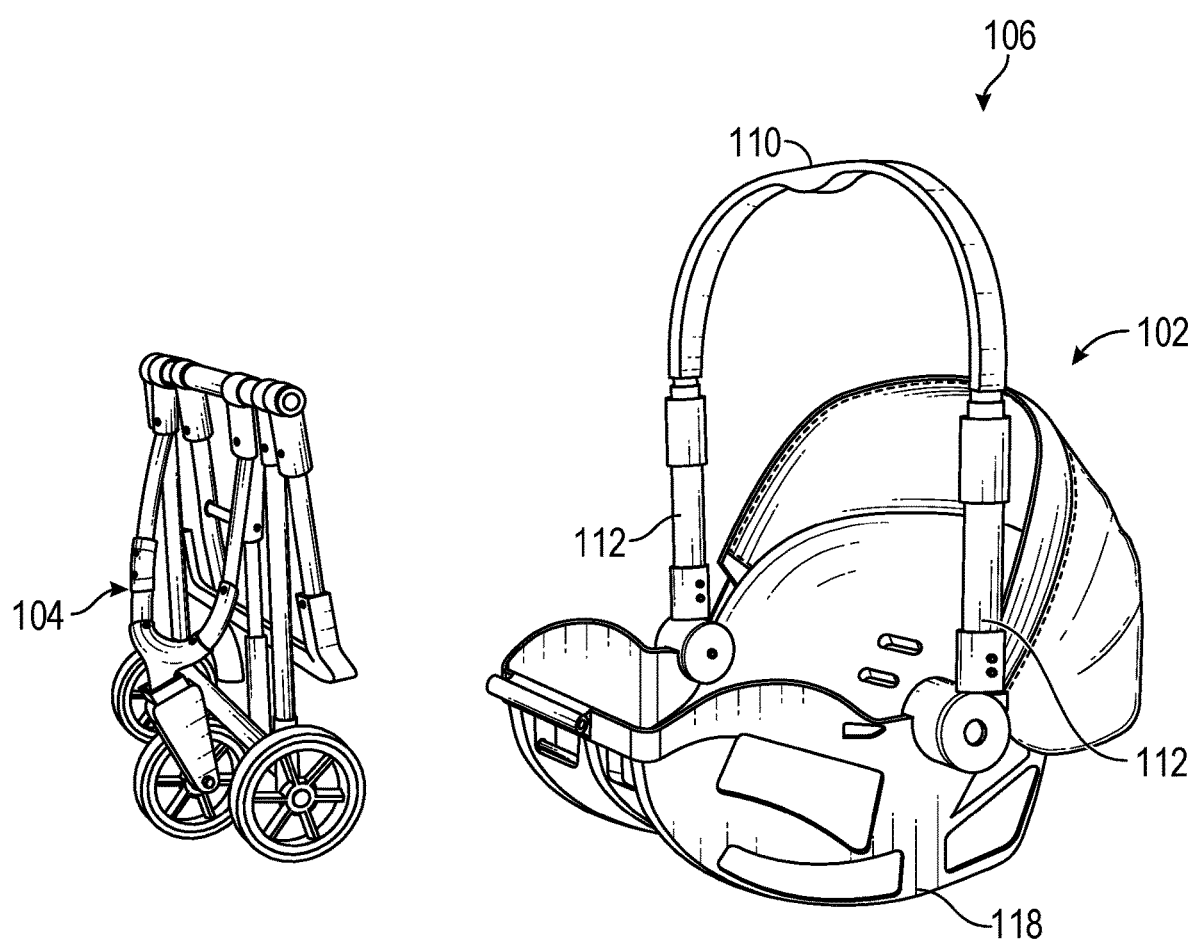
FIG. 4 illustrates a perspective view of an example infant child seat and wheeled frame according to an embodiment of the disclosure.

FIG. 4 illustrates a perspective view of an example infant child seat 102 and wheeled frame 104 according to an embodiment of the disclosure. Wheeled frame 104 is depicted in the storage configuration. Handling portion 110 is depicted in the recessed position, and the handle 106 is depicted in the carrying position. A user is depicted carrying both the infant child seat 102 and wheeled frame 104, illustrating the significant size and weight reductions realized by the present invention.

Also disclosed herein are methods for converting an infant child seat to a stroller. In certain embodiments, an example method may include providing an infant child seat including a handle that is rotatable between a carrying position, a stroller position, and a stowed position, the handle including a handling portion that is slidable between a recessed position and an elongated position. The method may include providing a wheeled frame that is configured to fold between an operable configuration and a storage configuration. The method may include unfolding the wheeled frame into the operable configuration. The method may include manually actuating, by a first hand of a user, the handle on the infant child seat into the carrying position so that the user many pick up and/or maneuver the infant child seat. The method may include coupling the infant child seat to the wheeled frame using a first coupling means on the infant child seat that is configured to couple to a second coupling means on the wheeled frame. The method may include manually actuating, by the first hand of the user, the handle into the stroller position and the handling portion into the elongated portion. When the wheeled frame is in the operable configuration, the infant child seat is coupled to the wheeled frame, the handle is in the stroller position, and the handling portion is in the elongated position, the infant child seat and wheeled frame are operable as a stroller by pushing the handle of the infant child seat.

While the above description contains many specifics, these specifics should not be construed as limitations on the scope of the disclosure, but merely as exemplifications of the disclosed embodiments. Those skilled in the art will envision many other possible variations that are within the scope of the disclosure.

Additionally, although example embodiments have been described in language specific to structural features and/or methodological acts, it is to be understood that the disclosure is not necessarily limited to the specific features or acts described. Rather, the specific features and acts are disclosed as illustrative forms of implementing the example embodiments. Conditional language, such as, among others, "can," "could," "might," or "may," unless specifically stated otherwise, or otherwise understood within the context as used, is generally intended to convey that certain example embodiments could include, while other example embodiments do not include, certain features, elements, operations, and/or steps. Thus, such conditional language is not generally intended to imply that features, elements, operations, and/or steps are in any way required for one or more embodiments.

What is claimed is:

1. A system comprising:
    an infant child seat comprising a first coupling means defined by a lower portion of the infant child seat;
    a wheeled frame having a second coupling means configured to couple with the first coupling means, wherein the infant child seat is removably coupleable to the wheeled frame; and
    a handle coupled to the infant child seat and configured to carry the infant child seat when separated from the wheeled frame, and further configured to manipulate the wheeled frame when the infant child seat is mounted to the wheeled frame,
    wherein the second coupling means comprises an upper portion of the wheeled frame that defines an angled interior portion when in a first configuration and wherein in the first configuration the infant child seat is coupleable to the angled interior portion such that a front portion of the infant child seat is in contact with a first surface of the angled interior portion and a back portion of the child seat is in contact with a second surface of the angled interior portion and wherein the first coupling means and the second coupling means provide a tactile feedback when secured to one another.

2. The system of claim 1, wherein the handle is rotatable between (i) a carrying position for carrying the infant child seat when separated from the wheeled frame, (ii) a stroller position for pushing the wheeled frame when the infant child seat is mounted to the wheeled frame, and (iii) a stowed position for securing the infant child seat in an automobile or storing the infant child seat when not in use.

3. The system of claim 1, wherein the handle comprises a handling portion and a pair of arms, wherein the handling portion is slidably disposed within the pair of arms in a telescopic manner, and wherein the pair of arms are rotatably coupled to the infant child seat.

4. The system of claim 3, wherein the handling portion is configured to slide relative to the pair of arms between a recessed position and an elongated position.

5. The system of claim 3, wherein the handling portion comprises a handle lock configured to be actuated by a user and configured to lock the handling portion into a recessed position or into an elongated position.

6. The system of claim 1, wherein the wheeled frame is configured to fold between an operable configuration and a storage configuration.

7. The system of claim 6, wherein when the wheeled frame is in the storage configuration, the wheeled frame is configured to be stowed in a standard airplane overhead compartment or in a floorboard of an automobile.

8. The system of claim 1, wherein a weight of the wheeled frame is between 5 pounds (2.3 kg) and 8 pounds (3.6 kg).

9. The system of claim 1, wherein a height of the wheeled frame when in the storage configuration is between 15 inches (38.1 cm) and 20 inches (50.8 cm), a width of the wheeled frame when in the storage configuration is between 14 inches (35.6 cm) and 19 inches (48.3 cm), and a depth of the wheeled frame when in the storage configuration is between 4 inches (10.2 cm) and 8 inches (20.3 cm).

10. The system of claim 1, wherein a volume of the wheeled frame in the storage configuration does not exceed 14 square feet (1.3 m2).

11. A wheeled frame, the wheeled frame being removably securable to an infant child seat, the wheeled frame comprising:
   a frame movable between a folded storage configuration and an expanded stroller configuration, the frame comprising a first coupling means that includes an upper portion defining an angled interior portion configured to removably receive a second coupling means of the infant child seat in the expanded stroller configuration, wherein in the expanded stroller configuration:
      a front portion of the infant child seat is in contact with a first surface of the angled interior portion and a back portion of the infant child seat is in contact with a second surface of the angled interior portion,
      a handle of the infant child seat is used to maneuver the wheeled frame;
      the first coupling means is in contact with the second coupling means,
      the first coupling means and the second coupling means provide a tactile feedback when secured to one another; and
   a plurality of wheels coupled to the frame.

12. The wheeled frame of claim 11, wherein the angled interior portion is configured to receive the infant child seat in a horizontal position.

13. The wheeled frame of claim 12, further comprising a lower section and an axle coupling the lower section to the upper section, wherein the frame is foldable about the axle between the folded storage configuration and the expanded stroller configuration.

14. The wheeled frame of claim 11, wherein the plurality of wheels consists of three wheels.

15. The system of claim 1, wherein in the stroller configuration, the infant child seat rests on the angled interior portion in a horizontal orientation.

\* \* \* \* \*